US007204141B2

(12) United States Patent
Kamatsuke

(10) Patent No.: US 7,204,141 B2
(45) Date of Patent: Apr. 17, 2007

(54) FUEL LEVEL CONTROL SYSTEM FOR INTERNAL COMBUSTION ENGINE

(75) Inventor: Hiroshi Kamatsuke, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 87 days.

(21) Appl. No.: 11/195,278

(22) Filed: Aug. 2, 2005

(65) Prior Publication Data

US 2006/0027017 A1 Feb. 9, 2006

(30) Foreign Application Priority Data

Aug. 4, 2004 (JP) ............................ 2004-228119

(51) Int. Cl.
*G01F 23/00* (2006.01)

(52) U.S. Cl. .................................................... 73/290 R

(58) Field of Classification Search ..................... None
See application file for complete search history.

(56) References Cited

U.S. PATENT DOCUMENTS 5,826,459 A 10/1998 Kataoka et al.
2006/0005622 A1* 1/2006 Burdi et al. ............. 73/304 C

FOREIGN PATENT DOCUMENTS

| | | |
|---|---|---|
| JP | 07-091332 | 4/1995 |
| JP | 09-287997 | 11/1997 |
| JP | 10-122016 | 5/1998 |

* cited by examiner

*Primary Examiner*—Hezron Williams
*Assistant Examiner*—Paul M. West
(74) *Attorney, Agent, or Firm*—Flynn, Thiel, Boutell & Tanis, P.C.

(57) ABSTRACT

In a fuel level control system for an internal combustion engine, more than one filter having different characteristics is applied to correct the fuel level value according to the condition of the vehicle, providing precise fuel level measurement. The fuel level control system for the engine includes a fuel level correction section in which fuel level detection is prevented until a first set time has elapsed from activation of an ignition switch. The fuel level is detected by the fuel level detector after the first set time has elapsed and the detected fuel level value is corrected with a weak filter of high followability. After a second set time has elapsed the detected fuel level value is corrected with a strong filter of low followability. The strong filter minimizes the effect of disturbances on the fuel level value.

3 Claims, 3 Drawing Sheets

FUEL LEVEL CONTROL SYSTEM FOR INTERNAL COMBUSTION ENGINE

FIELD OF THE INVENTION

This invention relates to fuel level control systems for internal combustion engines, and more particularly to a fuel level control system for the internal combustion engine for measurement of fuel level in a fuel tank without influence of disturbance such as battery voltage and swinging or splashing of the fuel.

BACKGROUND OF THE INVENTION

Vehicles that have an internal combustion engine are equipped with a fuel tank to store and supply the fuel to the engine. The fuel tank is provided with a fuel level detector to detect the amount of fuel remaining therein.

In one conventional device equipped with a fuel level detector to detect the fuel level in the fuel tank, as disclosed in JP Laid-Open No. H07-91332, a fuel gauge is located to output voltage based on the fuel level. The maximum or minimum output value of the fuel gauge is memorized or learned in a backup RAM, and, based on a ratio between the learned value and the output value, relative fuel level is calculated. Also another device, as disclosed in JP Laid-Open No. H09-287997, is equipped with a fuel level detector to detect the fuel level in a fuel tank. Fuel level data is compiled into one parcel block and is stored in RAM as block data. The stored block data is read as needed and is effected by process of simple average, weighted average, or outlying value removal. This processed fuel level is indicated by a fuel meter. Further, in another air-fuel ratio controller for an internal combustion engine, as disclosed in JP Laid-Open No. H10-122016, elements resultant of the engine combustion variation are extracted from the rotational speed variation detected by a rotational speed detector, and based on these extracted elements, the air-fuel ratio of a mixture supplied to the engine is controlled to a limited lean ratio. When calculating the rotational speed variation, the moving average is filtered with primary and secondary Butterworth filters. If this result is one, the rotational speed variation is calculated from the result filtered with the primary filter. If the result is zero, the rotational speed variation is calculated from the result filtered with the secondary filter.

Conventionally, in the prior fuel level control system for the internal combustion engine, false detection of fuel level may occur due to the variation of the voltage output at start and stop of the engine that is output by the fuel level detector based on the fuel level. That is, it is mistaken for the situation of refueling even if there is no reduction/increase in the fuel level. On this account, the undesirable false diagnosis may occur while an OBD (on board diagnostics; for leak check during stop of the vehicle) is performed to determine whether the vehicle is refueled.

SUMMARY OF THE INVENTION

In order to obviate or at least minimize the above inconveniences, the present invention provides a fuel level control system for an internal combustion engine having a fuel level detector to detect the fuel remaining in a fuel tank. This fuel level control system corrects the fuel level value detected by the fuel level detector. The fuel level control system includes a fuel level correcting section wherein: fuel level detection is prevented until a first set time has elapsed from activation of an ignition switch; the fuel level is detected by the fuel level detector after the first set time has elapsed; the detected fuel level value is corrected with a weaker filter of higher followability; and the detected fuel level value is corrected with a stronger filter of lower followability, switching from the lower filter after a second set time for the filter-correction time of the fuel level value filtered with the weaker filter has elapsed.

According to the present invention, the intensity of the filter applied to the fuel level is changed so as to avoid or minimize influence of a disturbance such as battery voltage or swinging of the fuel. More than one filter of different characteristics is utilized to correct the fuel level value according to the state of the vehicle. This permits fuel level measurement with very high precision. Accordingly, precise and quick fuel level measurement can be achieved, which shortens the leak check time utilizing the fuel level value as one parameter for leak check.

In order to achieve precise fuel level measurement, the present invention utilizes a plurality of filters of different characteristics to correct the fuel level value. Embodiments of the present invention will now be described in detail with reference to the drawings.

DETAILED DESCRIPTION

Figure 1:
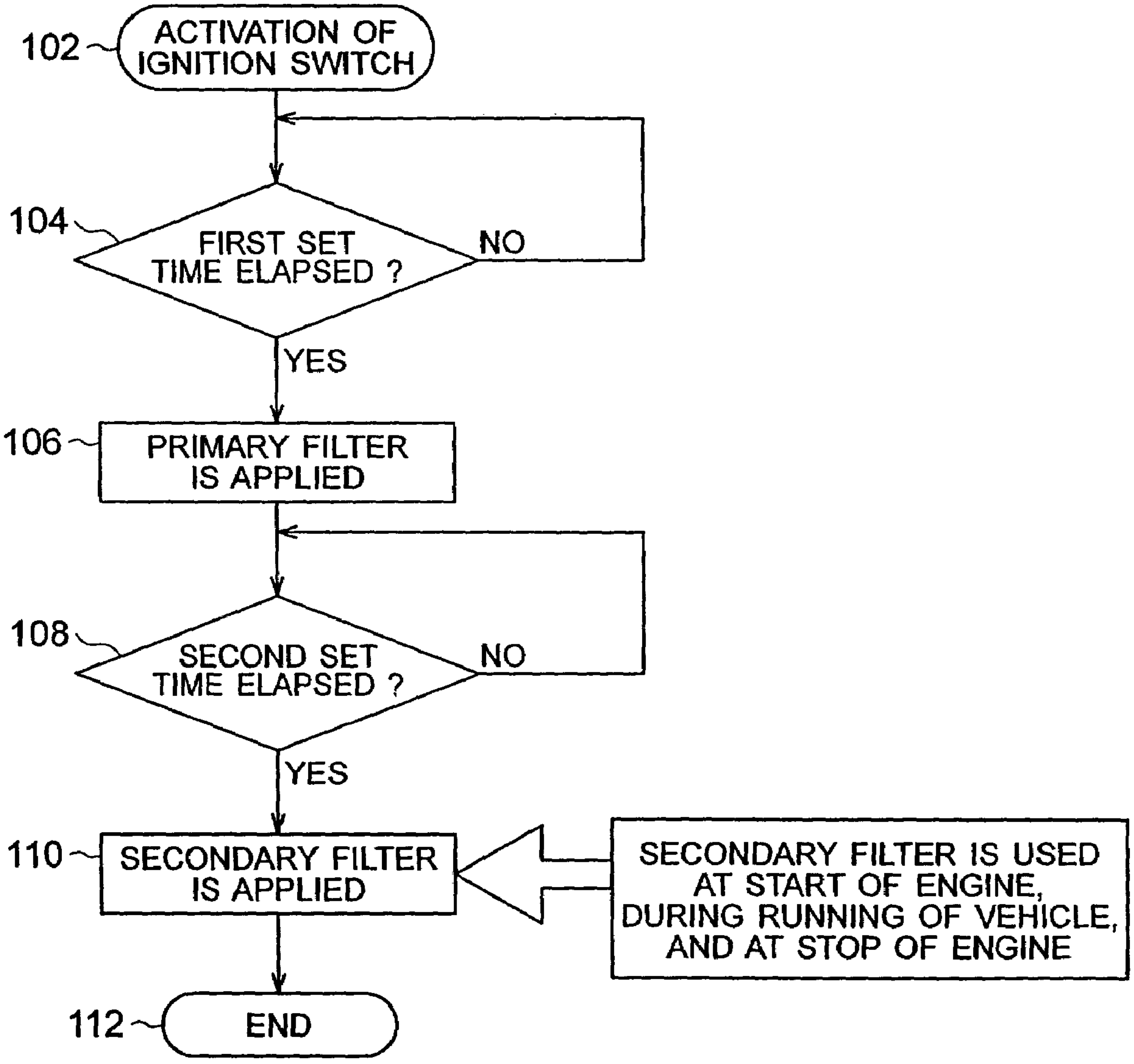
FIG. 1 is a flowchart for correction of the fuel level.
Figure 2:
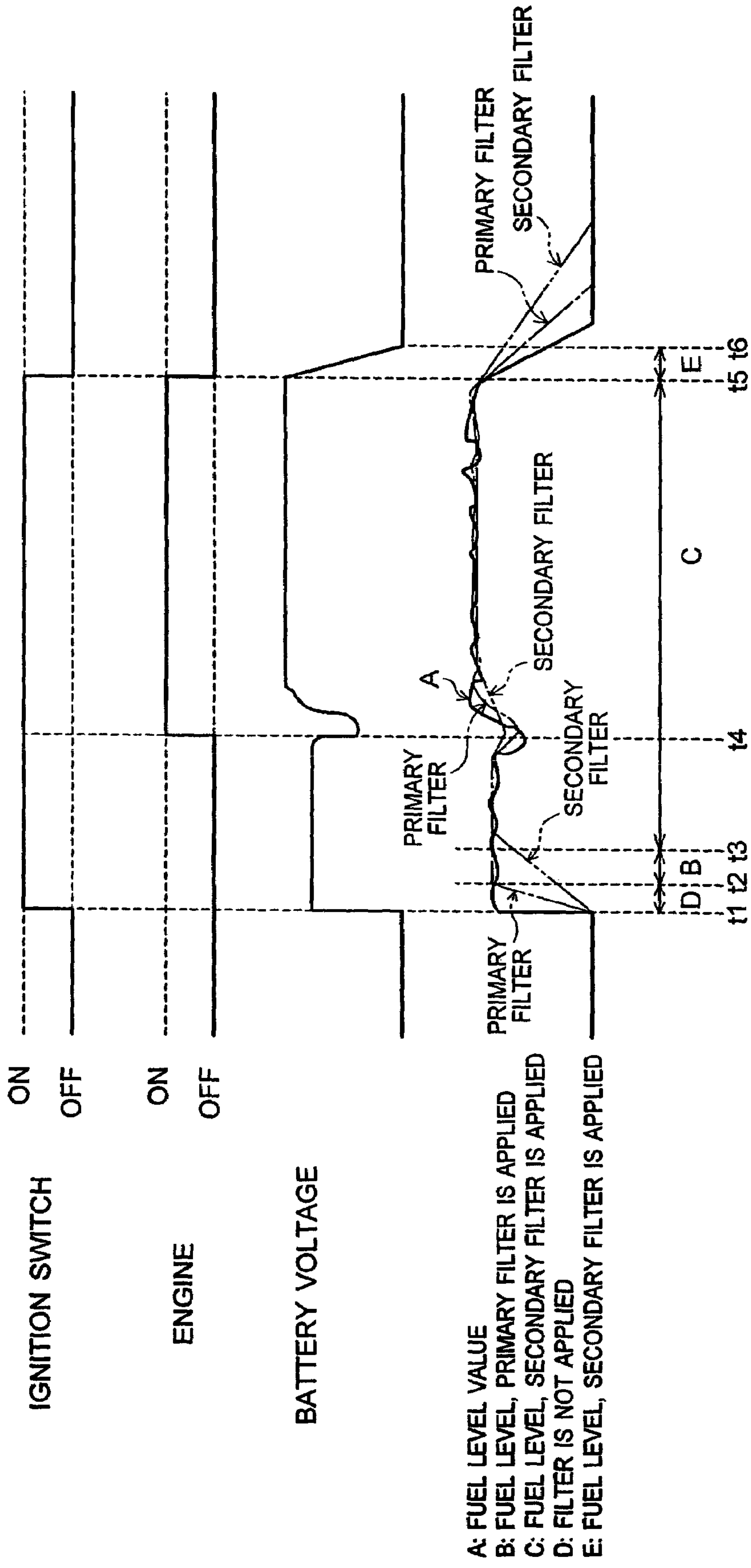
FIG. 2 is a time chart for correction of the fuel level.
Figure 3:
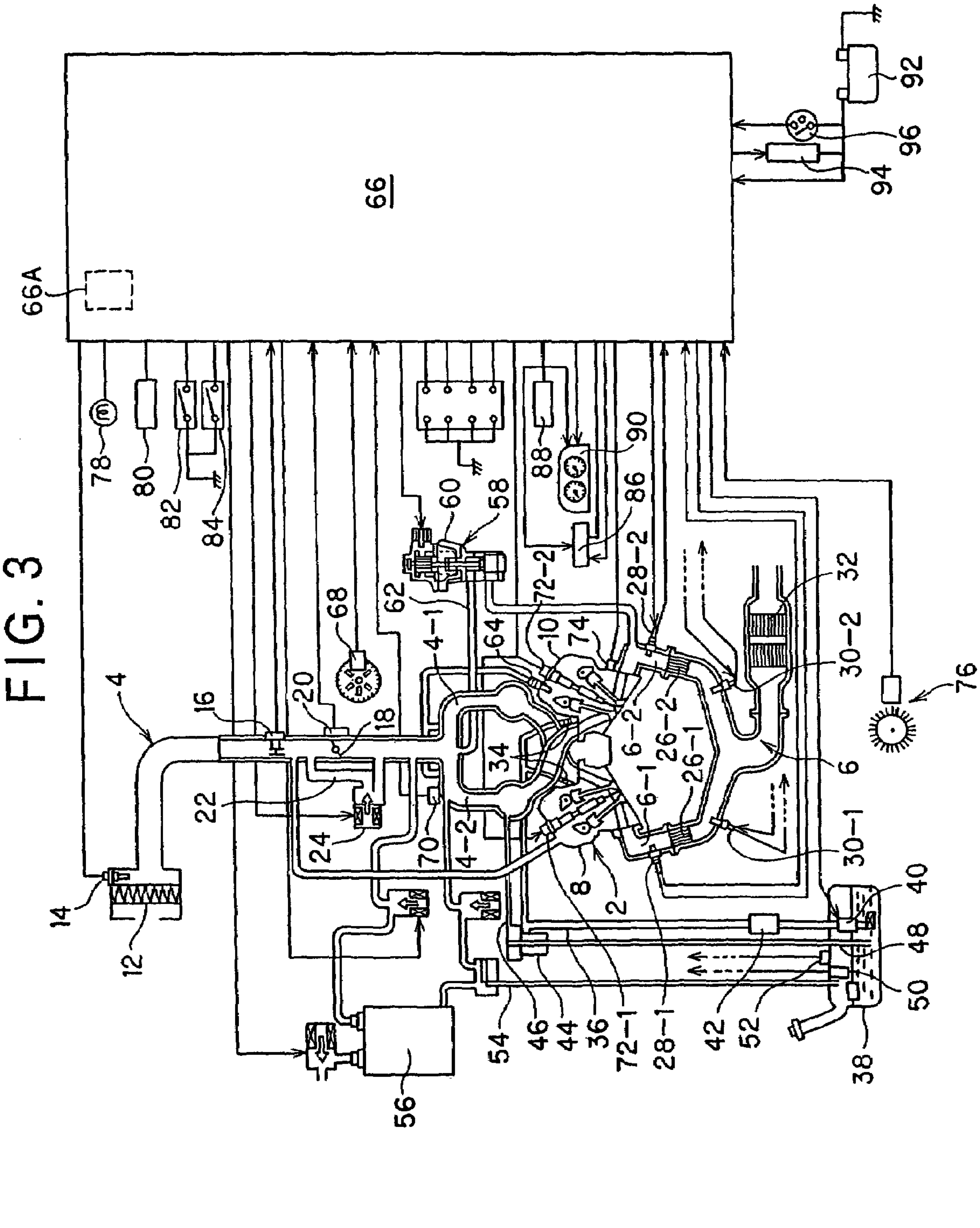
FIG. 3 is a diagram of the fuel level control system for the internal combustion engine.

FIGS. 1–3 illustrate an embodiment of the present invention.

FIG. 3 shows an internal combustion engine 2 mounted on a vehicle (not shown), an intake passage 4, and an exhaust passage 6. The engine 2 includes a first cylinder bank 8 and a second cylinder bank 10 formed in a V-shape.

The intake passage 4 includes, in turn from an upstream side, an air cleaner 12, an intake temperature sensor 14 to detect the temperature of intake air for the engine 2, an air flow sensor 16 to detect the flow rate of the intake air for the engine 2, and a throttle valve 18. The intake passage 4 has a downstream end branched into first and second branched intake passages 4-1, 4-2. The first branched intake passage 4-1 is connected to a combustion chamber (not shown) in the first cylinder bank 8, and the second branched intake passage 4-2 is connected to a combustion chamber in the second cylinder bank 10.

On the intake passage 4, a throttle opening sensor 20 is located to detect the opening angle of the throttle valve 18. Further, on the intake passage 4, a bypass passage 22 is formed to communicate between the upstream and downstream sides of the intake passage 4 while bypassing the throttle valve 18, thereby forming an intake air flow rate control system. On this bypass passage 22, an idle control valve (ISC valve) 24 is located to control flow rate of the intake air passing therethrough.

The exhaust passage 6 has an upstream end branched into first and second branched exhaust passages 6-1, 6-2. The first branched exhaust passage 6-1 is connected to the combustion chamber in the first cylinder bank 8, and the second branched exhaust passage 6-2 is connected to the combustion chamber in the second cylinder bank 10.

The first branched exhaust passage 6-1 includes a first catalytic converter 26-1, and the second branched exhaust passage 6-2 includes a second catalytic converter 26-2. Toward the upstream side of the first catalytic converter 26-1 in the first branched exhaust passage 6-1, a first front oxygen (exhaust) sensor 28-1 is located to detect the concentration of oxygen in the exhaust in the first branched exhaust passage 6-1. Also, toward the downstream side of the first catalytic converter 26-1 in the first branched exhaust passage 6-1, a first rear oxygen (exhaust) sensor 30-1 is located.

Toward the upstream side of the second catalytic converter 26-2 in the second branched exhaust passage 6-2, a second front oxygen (exhaust) sensor 28-2 is located to detect the concentration of oxygen in the exhaust in the second branched exhaust passage 6-2. Also, toward the downstream side of the second catalytic converter 26-2 in the second branched exhaust passage 6-2, a second rear oxygen (exhaust) sensor 30-2 is located.

In the lower reaches of the first and second rear oxygen sensors 30-1 and 30-2, the first and second branched exhaust passages 6-1 and 6-2 are merged. In the lower reaches of this juncture, a three-way catalytic converter 32 is disposed.

The engine 2 includes a fuel injection valve 34 facing toward the combustion chamber. This fuel injection valve 34 is connected to a fuel tank 38 through a fuel supply passage 36. The fuel in the fuel tank 38 is forced by a fuel pump 40 to be filtered by a fuel filter 42 and supplied to the fuel injection valve 34.

On the fuel supply passage 36, a fuel pressure regulator 44 is communicated to control the pressure of the fuel. This fuel pressure regulator 44 regulates the pressure of the fuel at a certain value by the intake pressure introduced through a pressure introduction passage 46 in communication with the intake passage 4. Excess fuel is returned to the fuel tank 38 through a fuel return passage 48.

The fuel tank 38 includes a fuel level gauge 50 as a fuel level detector to detect the fuel remaining in the fuel tank 38, and a fuel pressure sensor 52 to detect the pressure of the fuel in the fuel tank 38.

The fuel tank 38 is communicated to the lower reaches of the intake passage 4 with respect to the throttle valve 18 through an evaporative fuel passage 54. A canister 56 is located on the evaporative fuel passage 54.

The engine 2 includes an EGR (exhaust gas recirculation) device 58. The EGR device 58 includes an EGR valve 60 to regulate the flow rate of the exhaust gas recirculation that is returned to the intake system from the exhaust system. This EGR valve 60 is associated with an EGR passage 62 that communicates between the second branched exhaust passage 6-2 on the upstream side with respect to the second front oxygen sensor 28-2 and a juncture of the first and second branched intake passages 4-1, 4-2 so as to electronically control the quantity of the exhaust gas recirculation.

The second cylinder bank 10 of the engine 2 includes a PCV (positive crankcase ventilation) valve 64.

A control unit (electronic control module ECM) 66 is connected to the intake air temperature sensor 14, the airflow sensor 16, the throttle opening sensor 20, the idle control valve 24, the first front oxygen sensor 28-1, the first rear oxygen sensor 30-1, the second front oxygen sensor 28-2, the second rear-oxygen sensor 30-2, the fuel injection valve 34, the fuel pump 40, the fuel level gauge 50, the pressure sensor 52, and the EGR valve 60.

In addition, the control unit 66 is connected to: a cam angle sensor 68 to detect an angle of a camshaft (not shown) of the engine 2 to output a cam-angle signal; an intake pressure sensor 70 to detect the pressure in the intake pipe; ignition coil assemblies 72-1 and 72-2; a coolant temperature sensor 74 to detect the temperature of coolant for the engine 2 as engine coolant temperature; a crank angle sensor 76 to detect an angle of a crankshaft (not shown) for the engine 2 to output a crankshaft angle signal; an indicator lamp 78; a connection terminal 80; a power steering pressure switch 82; a heater blower fan switch 84; a cruise control module 86; a vehicle speed sensor 88 to detect the speed of vehicle traveling; a combination meter 90; a main relay 94 in connection to the battery 92; and an ignition switch (IG) 96 that is actuated upon turning of an engine key and outputs an ignition signal.

The control unit 66 includes a fuel level correct section 66A to correct the fuel level value detected by the fuel level gauge 50 or the fuel level detector. This fuel level correct section 66A typically calculates the fuel level based on the voltage received from the fuel level gauge 50. Since the voltage produced by the fuel level gauge 50 is susceptible to the battery voltage, the fuel level is corrected with reference to 13.5 volts as follows: Fuel level=voltage (detected by the fuel level gauge)*13.5/battery voltage.

The fuel level correct section 66A of the control unit 66 prevents or halts the detection of the fuel level until a first set time has elapsed from activation of the ignition switch 96. After elapsing of the first set time, the fuel level gauge 50 or the fuel level detector detects the fuel level. By the fuel level correct section 66A of the control unit 66, the detected fuel level value is corrected with a weaker filter or filter circuit (primary filter) of higher followability (i.e. fast response). After a second set time for the fuel level value filtered with the weak filter has elapsed, the level correct section 66A switches from the weak filter so that the detected fuel level value is corrected with a stronger filter or filter circuit (secondary filter) of lower followability (i.e. slow response). Thus the secondary filter has a significantly slower response time than the primary filter.

The weaker filter (primary filter) of high followability is provided for the fuel level correction to remove or minimize disturbances such as the battery voltage and the swinging or splashing of the fuel from the detected fuel level value. This primary filter has a small phase lag with respect to the detected fuel level value, which is of high followability (fast response) but is of relatively low stability. In contrast, the stronger filter (secondary filter) of low followability is provided for the fuel level correction to remove or greatly minimize the disturbance caused by, for example, spikes in the battery voltage and the swinging or splashing of fuel from causing an error in the detected fuel level value. This secondary filter has a large phase lag with respect to the detected fuel level value, which is of low followability (slow response) but is of relatively high stability.

Next, the embodiment of the present invention is explained with reference to a flowchart of FIG. 1 as follows.

In step 102, a program starts upon activation of the ignition switch 96. Firstly, a determination is made in step 104 whether the first set time has elapsed from activation of the ignition switch 96. If the determination in step 104 is "NO", this determination is repeated.

If the determination in step 104 is "YES", the fuel level value is detected by the fuel level gauge 50, and this detected fuel level value is corrected with the weaker filter (primary filter) of high followability in step 106.

Then a determination is made in step 108 whether the second set time for correction of the fuel level by the weaker primary filter has elapsed. If the determination in step 108 is "NO", this determination is repeated.

If the determination in step 108 is "YES", the detected fuel level value is corrected with the stronger filter (secondary filter) of low followability, instead of the weaker filter (primary filter) of high followability, in step 110. The correction with the stronger filter (secondary filter) of low followability is performed in all situations at start (cranking) of the engine 2, during running of the vehicle, and during engine stop.

Then the program ends in step 112.

Next, the correction of the fuel level value is explained with reference to a time chart of FIG. 2.

At time t1, the ignition switch 96 is turned on and the battery voltage rises from 0 volt (an off state).

When the battery voltage rises from 0 volt upon the actuation of the ignition switch 96, a false detection, the fuel level being at 0%, occurs due to the battery correction.

In order to avoid this false detection of the fuel level, the fuel level measurement is suspended temporary for a certain time from the actuation of the ignition switch 96 (between times t1 and t2; the first set time is shown by the period D in FIG. 2).

This suspension of the fuel level measurement for the certain time from the actuation of the ignition switch 96 (between times t1–t2) avoids the false detection of the fuel level.

However, the time until detection of the fuel level delays completion of OBD (e.g. leak diagnosis during stop of the vehicle). This delay results in a large lag of finish timing of the diagnosis as compared to the normal timing.

In the OBD (leak diagnosis during stop of the vehicle), it is determined whether the vehicle is refueled during stop of the vehicle in order to avoid a false diagnosis. Also, one diagnosis for one-driving cycle as required by U.S. regulations, means one diagnosis between start of the engine and the next start of the engine. Large lag of the time needed to complete the diagnosis is undesirable.

In this refuel determination method for leak diagnosis, the refuel is determined based on the difference between the fuel level values at deactivation and activation of the ignition switch 96. Accordingly, the leak diagnosis is not completed until the fuel level at activation of the ignition switch 96 is measured.

On this account, the primary filter (weaker filter) of high followability (fast response) is employed to measure the fuel level after elapsing of the first set time (at second set time: t2–t3) at start of the fuel level measurement after activation of the ignition switch 96 (the second set time is indicated by the period B in FIG. 2).

Thereby, the fuel level measurement time can be shortened and therefore completion of the leak diagnosis is shortened owing to the early transition from a situation of low battery voltage to a normal situation (the second set time indicated by the period B).

In addition, the false detection of the fuel level may also occur in case of abrupt variations in the battery voltage (toward lower voltage) at start of the engine 2 (time t4) or in case of large swinging of the fuel during running of the vehicle after start of the engine 2, which cannot be covered by the modification of the battery voltage.

To avoid this false detection of the fuel level, the secondary filter (stronger filter) which does not rapidly respond to the battery voltage or the splashing of the fuel is employed after elapsing of the second set time (time t3) until stop of the engine 2 (time t5), thus overlapping the start of the engine 2 (time t4). This time period is shown by period C in FIG. 2.

Further, the false detection may also occur at stop of the engine 2 when the ignition switch is turned off (time t5) and abrupt variations in the battery voltage (toward lower voltage) occurs, which cannot be covered by the modification of the battery voltage.

To avoid this false detection of the fuel level, the secondary filter (stronger filter) is employed for a certain time after stop of the engine 2 (time t5–t6). This period is shown by the period E in FIG. 2.

As thus described, the fuel level correct section of the control unit prevents or halts the detection of the fuel level until the first set time has elapsed from activation of the ignition switch 96. After elapsing of the first set time D, the fuel level gauge 50 or the fuel level detector detects the fuel level. The detected fuel level value is corrected with the weaker filter (primary filter) of higher followability. After the second set time B during which the fuel level value filtered with the weaker filter has elapsed, the detected fuel level value is corrected by switching from the weaker filter to the stronger filter (secondary filter) of lower followability. The intensity of the filter applied to the fuel level value is switched according to the condition of the vehicle in order to avoid or minimize the effect of a disturbance such as battery voltage and the swinging or splashing of the fuel, such as indicated at t4 in FIG. 2. That is, more than one filter having different characteristics is applied according to the condition of the vehicle to correct the fuel level value. This permits fuel level measurement with very high precision. Accordingly, precise and quick fuel level measurement can be achieved, which shortens the leak check time utilizing the fuel level value as one parameter for leak check.

Incidentally, in the present invention, more than one secondary filter having different characteristics may be provided. During running, in particular accelerating or decelerating of the vehicle where disturbances are prone to generate, the plurality of secondary filters may be selectively applied based on the grade or type of the disturbance to achieve precise correction of the fuel level.

According to the condition of the vehicle, more than one filter having different characteristics is applied to correct the fuel level. This correction also may be applied to another control system.

I claim:

1. A fuel level control system for an internal combustion engine having a fuel level detector to detect the fuel remaining in a fuel tank, said fuel level control system correcting the fuel level value detected by said fuel level detector, comprising:

a fuel level correcting section, wherein fuel level detection is prevented until a first set time has elapsed from activation of an ignition switch, the fuel level is detected by said fuel level detector after said first set time has elapsed, the detected fuel level value is corrected with a weak filter of high followability, and the detected fuel level value is corrected with a strong filter of low followability, switching to the strong filter after a second set time for the filter-correction time of the fuel level value filtered with the weak filter has elapsed.

2. A method of detecting a fuel level value of fuel remaining in a fuel tank with a fuel level control system for an internal combustion engine, said fuel level control system correcting the fuel level value detected by a fuel level detector, comprising a fuel level correcting section, including the steps of:

detecting activation of an ignition switch;

delaying fuel level detection until after a first set time has elapsed from activation of the ignition switch;

detecting a fuel level value with the fuel level detector;

correcting the detected fuel level value with a weak filter circuit of high followability and low stability;

after a second set time, switching from the weak filter circuit to a strong filter circuit of low followability and high stability for correcting the fuel level value; and correcting the detected fuel level value with the strong filter circuit until the engine stops.

3. The method of claim 2, wherein the first elapsed time finishes before the engine starts.

* * * * *